(12) United States Patent
Nishimura et al.

(10) Patent No.: US 7,284,525 B2
(45) Date of Patent: Oct. 23, 2007

(54) STRUCTURE FOR CONNECTING PISTON TO CRANKSHAFT

(75) Inventors: Kimio Nishimura, Yokohama (JP); Yutaka Mabuchi, Yokohama (JP); Takashi Murata, Yokohama (JP); Takuya Hirata, Yokohama (JP); Makoto Kano, Yokohama (JP); Takahiro Hamada, Yokohama (JP); Masashi Yamaguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 10/914,505

(22) Filed: Aug. 10, 2004

(65) Prior Publication Data

US 2005/0061291 A1    Mar. 24, 2005

(30) Foreign Application Priority Data

Aug. 13, 2003 (JP) ............................. 2003-207494
Aug. 21, 2003 (JP) ............................. 2003-208286

(51) Int. Cl.
*B32B 4/00* (2006.01)
(52) U.S. Cl. .................................. 123/193.6; 123/193.3
(58) Field of Classification Search .............. 123/193.6, 123/193.3, 196 R
See application file for complete search history.

(56) References Cited

U.S. PATENT DOCUMENTS

| 1,461 A | 12/1839 | Day |
|---|---|---|
| 2,716,972 A | 9/1955 | Farny et al. |
| 2,982,733 A | 5/1961 | Wright et al. |
| 3,211,647 A | 10/1965 | O'Halloran et al. |
| 3,790,315 A | 2/1974 | Emanuelsson et al. |
| 3,846,162 A | 11/1974 | Bloom |
| 3,932,228 A | 1/1976 | Sugiyama et al. |
| 4,031,023 A | 6/1977 | Musser et al. |
| 4,367,130 A | 1/1983 | Lemelson |
| 4,385,880 A | 5/1983 | Lemelson |

(Continued)

FOREIGN PATENT DOCUMENTS

CA         2009582         8/1990

(Continued)

OTHER PUBLICATIONS

U.S. Appl. No. 10/914,276, filed Aug. 10, 2004, Murata et al.

(Continued)

*Primary Examiner*—Noah P. Kamen
*Assistant Examiner*—Jason Benton
(74) *Attorney, Agent, or Firm*—Foley & Lardner LLP

(57) ABSTRACT

There is provided a structure for connecting a piston to a crankshaft in an internal combustion engine, including a piston pin fitted into the piston, a crankpin integral with the crankshaft and a connecting rod having a piston pin bearing portion slidably engaged with an outer cylindrical portion of the piston pin and a crankpin bearing portion slidably engaged with an outer cylindrical portion of the crankpin. At least one of the piston pin bearing portion of the connecting rod and the outer cylindrical portion of the piston pin and at least one of the crankpin bearing portion of the connecting rod and the outer cylindrical portion of the crankpin have hard carbon coatings formed thereon with a hydrogen content of 20 atomic % or less.

10 Claims, 1 Drawing Sheet

U.S. PATENT DOCUMENTS

| | | |
|---|---|---|
| 4,538,929 A | 9/1985 | Ehrentraut et al. |
| 4,554,208 A * | 11/1985 | MacIver et al. ............ 428/332 |
| 4,645,610 A | 2/1987 | Born et al. |
| 4,702,808 A | 10/1987 | Lemelson |
| 4,712,982 A | 12/1987 | Inagaki et al. |
| 4,755,237 A | 7/1988 | Lemelson |
| 4,755,426 A | 7/1988 | Kokai et al. |
| 4,783,368 A | 11/1988 | Yamamoto et al. |
| 4,834,400 A | 5/1989 | Lebeck |
| 4,842,755 A | 6/1989 | Dunn |
| 4,859,493 A | 8/1989 | Lemelson |
| 4,874,596 A | 10/1989 | Lemelson |
| 4,919,974 A | 4/1990 | McCune et al. |
| 4,933,058 A | 6/1990 | Bache et al. |
| 4,943,345 A | 7/1990 | Asmussen et al. |
| 4,960,643 A | 10/1990 | Lemelson |
| 4,974,498 A | 12/1990 | Lemelson |
| 4,980,021 A | 12/1990 | Kitamura et al. |
| 4,980,610 A | 12/1990 | Varga |
| 4,981,717 A | 1/1991 | Thaler |
| 4,988,421 A | 1/1991 | Drawl et al. |
| 4,992,082 A | 2/1991 | Drawl et al. |
| 5,000,541 A | 3/1991 | DiMarcello et al. |
| 5,021,628 A | 6/1991 | Lemelson |
| 5,032,243 A | 7/1991 | Bache et al. |
| 5,036,211 A | 7/1991 | Scott |
| 5,040,501 A | 8/1991 | Lemelson |
| 5,067,826 A | 11/1991 | Lemelson |
| 5,077,990 A | 1/1992 | Plath |
| 5,078,848 A | 1/1992 | Anttila et al. |
| 5,087,608 A | 2/1992 | Chan et al. |
| 5,096,352 A | 3/1992 | Lemelson |
| 5,110,435 A | 5/1992 | Haberland |
| 5,112,025 A | 5/1992 | Nakayama et al. |
| 5,127,314 A | 7/1992 | Swain |
| 5,131,941 A | 7/1992 | Lemelson |
| 5,132,587 A | 7/1992 | Lemelson |
| 5,142,785 A | 9/1992 | Grewal et al. |
| 5,143,634 A | 9/1992 | Quinga et al. |
| 5,148,780 A | 9/1992 | Urano et al. |
| 5,187,021 A | 2/1993 | Vydra et al. |
| 5,190,807 A | 3/1993 | Kimock et al. |
| 5,190,824 A | 3/1993 | Itoh |
| 5,202,156 A | 4/1993 | Yamamoto et al. |
| 5,205,188 A | 4/1993 | Repenning et al. |
| 5,205,305 A | 4/1993 | Yamakita |
| H1210 H | 7/1993 | Jansen |
| 5,232,568 A | 8/1993 | Parent et al. |
| 5,237,967 A | 8/1993 | Willermet et al. |
| 5,249,554 A | 10/1993 | Tamor et al. |
| 5,255,783 A | 10/1993 | Goodman et al. |
| 5,255,929 A | 10/1993 | Lemelson |
| 5,284,394 A | 2/1994 | Lemelson |
| 5,288,556 A | 2/1994 | Lemelson |
| 5,295,305 A | 3/1994 | Hahn et al. |
| 5,299,937 A | 4/1994 | Gow |
| 5,317,938 A | 6/1994 | de Juan, Jr. et al. |
| 5,326,488 A | 7/1994 | Minokami et al. |
| 5,332,348 A | 7/1994 | Lemelson |
| 5,334,306 A | 8/1994 | Dautremont-Smith et al. |
| 5,349,265 A | 9/1994 | Lemelson |
| 5,358,402 A | 10/1994 | Reed et al. |
| 5,359,170 A | 10/1994 | Chen et al. |
| 5,360,227 A | 11/1994 | Lemelson |
| 5,380,196 A | 1/1995 | Kelly et al. |
| 5,401,543 A | 3/1995 | O'Neill |
| H1461 H | 7/1995 | DiVita et al. |
| 5,432,539 A | 7/1995 | Anderson |
| 5,433,977 A | 7/1995 | Sarin et al. |
| H1471 H | 8/1995 | Braun et al. |
| 5,443,032 A | 8/1995 | Vichr et al. |
| 5,447,208 A | 9/1995 | Lund et al. |
| 5,456,406 A | 10/1995 | Lemelson |
| 5,458,754 A | 10/1995 | Sathrum et al. |
| 5,461,648 A | 10/1995 | Nauflett et al. |
| 5,462,772 A | 10/1995 | Lemelson |
| 5,464,667 A | 11/1995 | Köhler et al. |
| 5,466,431 A | 11/1995 | Dorfman et al. |
| 5,479,069 A | 12/1995 | Winsor |
| 5,482,602 A | 1/1996 | Cooper et al. |
| 5,491,028 A | 2/1996 | Sarin et al. |
| 5,497,550 A | 3/1996 | Trotta et al. |
| 5,509,841 A | 4/1996 | Winsor |
| 5,516,729 A | 5/1996 | Dawson et al. |
| 5,529,815 A | 6/1996 | Lemelson |
| 5,531,878 A | 7/1996 | Vadgama et al. |
| 5,541,566 A | 7/1996 | Deeney |
| 5,547,716 A | 8/1996 | Thaler |
| 5,551,959 A | 9/1996 | Martin et al. |
| 5,552,675 A | 9/1996 | Lemelson |
| 5,568,391 A | 10/1996 | Mckee |
| 5,593,719 A | 1/1997 | Dearnaley et al. |
| 5,616,372 A | 4/1997 | Conley et al. |
| 5,619,889 A | 4/1997 | Jones et al. |
| 5,628,881 A | 5/1997 | Lemelson |
| 5,630,275 A | 5/1997 | Wexler |
| 5,630,953 A | 5/1997 | Klink |
| 5,653,300 A | 8/1997 | Lund et al. |
| 5,669,144 A | 9/1997 | Hahn et al. |
| 5,672,054 A | 9/1997 | Cooper et al. |
| 5,688,557 A | 11/1997 | Lemelson et al. |
| 5,707,409 A | 1/1998 | Martin et al. |
| 5,714,202 A | 2/1998 | Lemelson et al. |
| 5,719,109 A | 2/1998 | Tokashiki et al. |
| 5,723,207 A | 3/1998 | Lettington et al. |
| 5,731,046 A | 3/1998 | Mistry et al. |
| 5,735,769 A | 4/1998 | Takemura et al. |
| 5,740,941 A | 4/1998 | Lemelson |
| 5,775,817 A | 7/1998 | Gottemoller et al. |
| 5,786,038 A | 7/1998 | Conley et al. |
| 5,790,146 A | 8/1998 | Anderson |
| 5,793,390 A | 8/1998 | Claflin et al. |
| 5,794,801 A | 8/1998 | Lemelson |
| 5,799,549 A | 9/1998 | Decker et al. |
| 5,806,557 A | 9/1998 | Helge |
| 5,824,387 A | 10/1998 | Boutaghou et al. |
| 5,834,708 A | 11/1998 | Svetal et al. |
| 5,840,662 A | 11/1998 | Nibert et al. |
| 5,843,571 A * | 12/1998 | Sho ............................ 428/336 |
| 5,851,962 A | 12/1998 | Kaga |
| 5,866,195 A | 2/1999 | Lemelson |
| 5,871,805 A | 2/1999 | Lemelson |
| 5,881,444 A | 3/1999 | Schaefer et al. |
| 5,901,021 A | 5/1999 | Hirano et al. |
| 5,910,940 A | 6/1999 | Guerra |
| 5,927,897 A | 7/1999 | Attar |
| 5,937,812 A | 8/1999 | Reedy et al. |
| 5,940,975 A | 8/1999 | Decker et al. |
| 5,945,214 A | 8/1999 | Ma et al. |
| 5,947,710 A | 9/1999 | Cooper et al. |
| 5,952,102 A | 9/1999 | Cutler |
| 5,958,261 A | 9/1999 | Offer et al. |
| 5,960,762 A | 10/1999 | Imai |
| 5,967,250 A | 10/1999 | Lund et al. |
| 5,968,596 A | 10/1999 | Ma et al. |
| 5,975,686 A | 11/1999 | Hauck et al. |
| 5,976,707 A | 11/1999 | Grab |
| 5,992,268 A | 11/1999 | Decker et al. |
| 5,993,938 A | 11/1999 | Tsukuda et al. |
| 6,006,415 A | 12/1999 | Schaefer et al. |
| 6,015,597 A | 1/2000 | David |
| 6,016,000 A | 1/2000 | Moslehi |
| 6,023,979 A | 2/2000 | Bills et al. |
| 6,028,393 A | 2/2000 | Izu et al. |

| Patent No. | Date | Inventors |
|---|---|---|
| 6,051,298 A | 4/2000 | Ko et al. |
| 6,056,443 A | 5/2000 | Koike et al. |
| 6,059,460 A | 5/2000 | Ono et al. |
| 6,059,830 A | 5/2000 | Lippincott, III et al. |
| 6,071,597 A | 6/2000 | Yang et al. |
| 6,083,313 A | 7/2000 | Venkatraman et al. |
| 6,083,570 A | 7/2000 | Lemelson et al. |
| 6,095,690 A | 8/2000 | Niegel et al. |
| 6,099,541 A | 8/2000 | Klopotek |
| 6,099,976 A | 8/2000 | Lemelson et al. |
| 6,106,919 A | 8/2000 | Lee et al. |
| 6,124,198 A | 9/2000 | Moslehi |
| 6,139,964 A | 10/2000 | Sathrum et al. |
| 6,142,481 A | 11/2000 | Iwashita et al. |
| 6,145,608 A | 11/2000 | Lund et al. |
| 6,156,439 A | 12/2000 | Coffinberry |
| 6,159,558 A | 12/2000 | Wolfe et al. |
| 6,160,683 A | 12/2000 | Boutaghou |
| 6,165,616 A | 12/2000 | Lemelson et al. |
| 6,170,156 B1 | 1/2001 | Lev et al. |
| 6,171,343 B1 | 1/2001 | Dearnaley et al. |
| 6,173,913 B1 | 1/2001 | Shafer et al. |
| 6,190,514 B1 | 2/2001 | Ma et al. |
| 6,193,906 B1 | 2/2001 | Kaneko et al. |
| 6,197,120 B1 | 3/2001 | David |
| 6,197,428 B1 | 3/2001 | Rogers |
| 6,203,651 B1 | 3/2001 | Järvenkylä et al. |
| 6,205,291 B1 | 3/2001 | Hughes et al. |
| 6,207,625 B1 * | 3/2001 | Ogano et al. ............ 508/365 |
| 6,227,056 B1 | 5/2001 | Bills et al. |
| 6,237,441 B1 | 5/2001 | Nishioka et al. |
| 6,237,852 B1 | 5/2001 | Svetal et al. |
| 6,238,839 B1 | 5/2001 | Tomita et al. |
| 6,255,262 B1 | 7/2001 | Keenan et al. |
| 6,261,424 B1 | 7/2001 | Goncharenko et al. |
| 6,272,971 B1 | 8/2001 | Thomsen et al. |
| 6,273,793 B1 | 8/2001 | Liners et al. |
| 6,274,220 B1 | 8/2001 | Tsukuda et al. |
| 6,289,593 B1 | 9/2001 | Decker et al. |
| 6,293,648 B1 | 9/2001 | Anderson |
| 6,296,552 B1 | 10/2001 | Boutaghou et al. |
| 6,299,425 B1 | 10/2001 | Hirano et al. |
| 6,305,416 B1 | 10/2001 | Snel et al. |
| 6,309,283 B1 | 10/2001 | Liners et al. |
| 6,311,524 B1 | 11/2001 | Brennan, III et al. |
| 6,316,734 B1 | 11/2001 | Yang |
| 6,322,431 B1 | 11/2001 | Schaenzer et al. |
| 6,322,719 B2 | 11/2001 | Kaneko et al. |
| 6,324,060 B1 | 11/2001 | Hsu |
| 6,325,385 B1 | 12/2001 | Iwashita et al. |
| 6,329,326 B1 | 12/2001 | Koganei et al. |
| 6,329,328 B1 * | 12/2001 | Koganei et al. ............ 508/365 |
| 6,333,298 B1 | 12/2001 | Waddoups et al. |
| 6,338,881 B1 | 1/2002 | Sellschopp et al. |
| 6,340,245 B1 | 1/2002 | Horton et al. |
| 6,358,123 B1 | 3/2002 | Liners et al. |
| 6,367,705 B1 | 4/2002 | Lee et al. |
| 6,368,676 B1 | 4/2002 | Gaudreau et al. |
| 6,377,422 B1 | 4/2002 | Boutaghou et al. |
| 6,379,383 B1 | 4/2002 | Palmaz et al. |
| 6,385,987 B2 | 5/2002 | Schlom et al. |
| 6,386,468 B1 | 5/2002 | Neuberger et al. |
| 6,399,215 B1 | 6/2002 | Zhu et al. |
| 6,401,058 B1 | 6/2002 | Akalin et al. |
| 6,439,845 B1 | 8/2002 | Veres |
| 6,439,986 B1 | 8/2002 | Myoung et al. |
| 6,452,752 B1 | 9/2002 | Boutaghou |
| 6,468,642 B1 | 10/2002 | Bray et al. |
| 6,471,979 B2 | 10/2002 | New et al. |
| 6,494,881 B1 | 12/2002 | Bales et al. |
| 6,523,456 B1 | 2/2003 | Kobayashi et al. |
| 6,524,212 B2 | 2/2003 | Ushijima et al. |
| 6,534,141 B1 | 3/2003 | Hull, Jr. et al. |
| 6,537,310 B1 | 3/2003 | Palmaz et al. |
| 6,537,429 B2 | 3/2003 | O'Donnell et al. |
| 6,543,394 B2 | 4/2003 | Tinney |
| 6,544,308 B2 | 4/2003 | Griffin et al. |
| 6,553,957 B1 | 4/2003 | Ishikawa et al. |
| 6,557,968 B2 | 5/2003 | Lee et al. |
| 6,562,445 B2 | 5/2003 | Iwamura |
| 6,562,462 B2 | 5/2003 | Griffin et al. |
| 6,570,172 B2 | 5/2003 | Kim et al. |
| 6,572,651 B1 | 6/2003 | DeScheerder et al. |
| 6,572,935 B1 | 6/2003 | He et al. |
| 6,572,937 B2 | 6/2003 | Hakovirta et al. |
| 6,585,064 B2 | 7/2003 | Griffin et al. |
| 6,586,069 B2 | 7/2003 | Dykes et al. |
| 6,589,640 B2 | 7/2003 | Griffin et al. |
| 6,592,519 B1 | 7/2003 | Martinez |
| 6,592,985 B2 | 7/2003 | Griffin et al. |
| 6,601,662 B2 | 8/2003 | Matthias et al. |
| 6,626,949 B1 | 9/2003 | Townley |
| 6,629,906 B1 | 10/2003 | Chiba et al. |
| 6,637,528 B2 | 10/2003 | Nishiyama et al. |
| 6,638,569 B2 | 10/2003 | McLaughlin et al. |
| 6,645,354 B1 | 11/2003 | Gorokhovsky |
| 6,656,329 B1 | 12/2003 | Ma et al. |
| 6,658,941 B1 | 12/2003 | Bills et al. |
| 6,666,328 B2 | 12/2003 | Sykora |
| 6,666,671 B1 | 12/2003 | Olver et al. |
| 6,684,513 B1 | 2/2004 | Clipstone et al. |
| 6,684,759 B1 | 2/2004 | Gorokhovsky |
| 6,695,865 B2 | 2/2004 | Boyle et al. |
| 6,699,106 B2 | 3/2004 | Myoung et al. |
| 6,701,627 B2 | 3/2004 | Korb et al. |
| 6,715,693 B1 | 4/2004 | Dam et al. |
| 6,726,993 B2 | 4/2004 | Teer et al. |
| 6,729,350 B2 | 5/2004 | Schick |
| 6,729,527 B2 | 5/2004 | Sonnenreich et al. |
| 6,733,513 B2 | 5/2004 | Boyle et al. |
| 6,739,214 B2 | 5/2004 | Griffin et al. |
| 6,739,238 B2 | 5/2004 | Ushijima et al. |
| 6,740,393 B1 | 5/2004 | Massler et al. |
| 6,745,742 B2 | 6/2004 | Meyer |
| 6,749,033 B2 | 6/2004 | Griffin et al. |
| 6,753,042 B1 | 6/2004 | Bakounine et al. |
| 6,753,635 B2 | 6/2004 | Kuhlmann-Wilsdorf |
| 6,761,532 B2 | 7/2004 | Capone et al. |
| 6,761,736 B1 | 7/2004 | Woo et al. |
| 6,780,177 B2 | 8/2004 | Shafirstein et al. |
| 6,797,326 B2 | 9/2004 | Griffin et al. |
| 6,799,468 B2 | 10/2004 | Borenstein |
| 6,806,242 B2 | 10/2004 | Shirahama et al. |
| 6,818,029 B2 | 11/2004 | Myoung et al. |
| 6,820,676 B2 | 11/2004 | Palmaz et al. |
| 6,821,189 B1 | 11/2004 | Coad et al. |
| 6,821,624 B2 | 11/2004 | Utsumi et al. |
| 6,822,788 B2 | 11/2004 | Blitstein |
| 6,849,085 B2 | 2/2005 | Marton |
| 6,855,237 B2 | 2/2005 | Kolpakov et al. |
| 6,855,791 B2 | 2/2005 | Van Doren et al. |
| 6,861,098 B2 | 3/2005 | Griffin et al. |
| 6,861,137 B2 | 3/2005 | Griffin et al. |
| 6,865,952 B2 | 3/2005 | Bills et al. |
| 6,866,894 B2 | 3/2005 | Trankiem et al. |
| 6,871,700 B2 | 3/2005 | Gorokhovsky |
| 6,872,203 B2 | 3/2005 | Shafirstein et al. |
| 6,878,447 B2 | 4/2005 | Griffin et al. |
| 6,880,469 B2 | 4/2005 | Frost |
| 6,882,094 B2 | 4/2005 | Dimitrijevic et al. |
| 6,883,476 B1 | 4/2005 | Nohara et al. |
| 6,886,521 B2 | 5/2005 | Hamada et al. |
| 6,887,585 B2 | 5/2005 | Herbst-Dederichs |
| 6,890,700 B2 | 5/2005 | Tomita et al. |
| 6,893,720 B1 | 5/2005 | Nakahigashi et al. |
| 6,969,198 B2 | 11/2005 | Konishi et al. |

| | | | | | |
|---|---|---|---|---|---|
| 2001/0036800 A1 | 11/2001 | Liners et al. | DE | 19507086 A1 | 9/1996 |
| 2002/0026899 A1 | 3/2002 | McLaughlin et al. | DE | 19507086 C2 | 9/1996 |
| 2002/0031987 A1 | 3/2002 | Liners et al. | DE | 197 04 224 | 8/1997 |
| 2002/0034631 A1 | 3/2002 | Griffin et al. | DE | 198 15 989 | 10/1999 |
| 2002/0034632 A1 | 3/2002 | Griffin et al. | DE | 198 25 860 | 12/1999 |
| 2002/0051286 A1 | 5/2002 | Blitstein | DE | 19825860 A1 | 12/1999 |
| 2002/0070357 A1 | 6/2002 | Kim et al. | DE | 100 17 459 | 10/2000 |
| 2002/0074168 A1 | 6/2002 | Matthias et al. | DE | 100 61 397 A1 | 5/2002 |
| 2002/0089571 A1 | 7/2002 | Lee et al. | DE | 101 58 683 | 6/2003 |
| 2002/0090155 A1 | 7/2002 | Ushijima et al. | DE | 103 18 135 | 11/2003 |
| 2002/0090578 A1 | 7/2002 | Schaefera et al. | DE | 10337559 A1 | 3/2005 |
| 2002/0130219 A1 | 9/2002 | Parseghlan et al. | EP | 0 286 996 | 10/1988 |
| 2002/0148430 A1 | 10/2002 | Kano et al. | EP | 0 291 006 A2 | 11/1988 |
| 2002/0155015 A1 | 10/2002 | Esumi et al. | EP | 0 299 785 | 1/1989 |
| 2002/0175476 A1 | 11/2002 | Chinou et al. | EP | 0308143 B1 | 3/1989 |
| 2003/0012234 A1 | 1/2003 | Watson et al. | EP | 0 333 416 | 9/1989 |
| 2003/0019111 A1 | 1/2003 | Korb et al. | EP | 0378378 B1 | 7/1990 |
| 2003/0019332 A1 | 1/2003 | Korb et al. | EP | 0384772 A1 | 8/1990 |
| 2003/0021995 A1 | 1/2003 | Griffin et al. | EP | 0388800 A2 | 9/1990 |
| 2003/0034182 A1 | 2/2003 | Griffin et al. | EP | 0392125 A1 | 10/1990 |
| 2003/0035957 A1 | 2/2003 | Griffin et al. | EP | 0398985 B1 | 11/1990 |
| 2003/0035958 A1 | 2/2003 | Griffin et al. | EP | 407977 | 1/1991 |
| 2003/0036341 A1 | 2/2003 | Myoung et al. | EP | 0 435 312 | 7/1991 |
| 2003/0037640 A1 | 2/2003 | Griffin et al. | EP | 0474369 A1 | 3/1992 |
| 2003/0069632 A1 | 4/2003 | De Scheerder et al. | EP | 0 500 253 | 8/1992 |
| 2003/0108777 A1 | 6/2003 | Gunsel et al. | EP | 0511153 A1 | 10/1992 |
| 2003/0114094 A1 | 6/2003 | Myoung et al. | EP | 0 529 327 | 3/1993 |
| 2003/0128903 A1 | 7/2003 | Yasuda et al. | EP | 0392125 B1 | 3/1993 |
| 2003/0159919 A1 | 8/2003 | Fairbairn et al. | EP | 0546824 A1 | 6/1993 |
| 2003/0162672 A1 | 8/2003 | Shirahama et al. | EP | 0308143 A1 | 11/1993 |
| 2003/0168323 A1 | 9/2003 | Frost | EP | 0573943 A1 | 12/1993 |
| 2003/0180565 A1 | 9/2003 | Herbst-Dederichs | EP | 0619504 A1 | 10/1994 |
| 2003/0199741 A1 | 10/2003 | Martinez | EP | 0621136 A2 | 10/1994 |
| 2003/0234371 A1 | 12/2003 | Ziegler | EP | 0624353 A3 | 11/1994 |
| 2003/0235691 A1 | 12/2003 | Griffin et al. | EP | 0624354 A3 | 11/1994 |
| 2004/0003638 A1 | 1/2004 | Schaefer et al. | EP | 0378378 B1 | 1/1995 |
| 2004/0008406 A1 | 1/2004 | Blitstein | EP | 0651069 A1 | 5/1995 |
| 2004/0010068 A1 | 1/2004 | Doren et al. | EP | 0652301 A1 | 5/1995 |
| 2004/0011900 A1 | 1/2004 | Gebhardt et al. | EP | 0656458 A3 | 6/1995 |
| 2004/0027018 A1 | 2/2004 | LeBlanc et al. | EP | 0 661 470 | 7/1995 |
| 2004/0035375 A1 | 2/2004 | Gibisch et al. | EP | 0396603 B1 | 6/1996 |
| 2004/0074467 A1 | 4/2004 | Hamada et al. | EP | 0388800 B1 | 12/1996 |
| 2004/0092405 A1 | 5/2004 | Konishi et al. | EP | 0 759 519 | 2/1997 |
| 2004/0105806 A1 | 6/2004 | Griffin et al. | EP | 0474369 B1 | 3/1997 |
| 2004/0109621 A1 | 6/2004 | Frost | EP | 0 818 622 | 1/1998 |
| 2004/0115435 A1 | 6/2004 | Griffin et al. | EP | 0652301 B1 | 1/1998 |
| 2004/0133301 A1 | 7/2004 | Van Doren et al. | EP | 0826790 A1 | 3/1998 |
| 2004/0154570 A1 | 8/2004 | Mabuchi et al. | EP | 0842754 A1 | 5/1998 |
| 2004/0168326 A1 | 9/2004 | Korb et al. | EP | 0 870 820 | 10/1998 |
| 2004/0184687 A1 | 9/2004 | Morales et al. | EP | 0816112 A3 | 10/1998 |
| 2004/0223256 A1 | 11/2004 | Feng et al. | EP | 0882759 A1 | 12/1998 |
| 2004/0241448 A1 | 12/2004 | Kano et al. | EP | 0893677 B1 | 1/1999 |
| 2004/0242435 A1 | 12/2004 | Nishimura et al. | EP | 0624353 B1 | 2/1999 |
| 2004/0244539 A1 | 12/2004 | Korb et al. | EP | 0656458 B1 | 2/1999 |
| 2004/0261614 A1 | 12/2004 | Hamada et al. | EP | 0 905 221 A1 | 3/1999 |
| 2005/0001201 A1 | 1/2005 | Bocko et al. | EP | 0 905 419 | 3/1999 |
| 2005/0005892 A1 | 1/2005 | Nishimura et al. | EP | 0647318 B1 | 3/1999 |
| 2005/0025975 A1 | 2/2005 | Okamoto et al. | EP | 0651069 B1 | 3/1999 |
| 2005/0035222 A1 | 2/2005 | Hamada et al. | EP | 0 731 190 B1 | 5/1999 |
| 2005/0056241 A1 | 3/2005 | Nomura et al. | EP | 0949200 A1 | 10/1999 |
| 2005/0061291 A1 | 3/2005 | Nishimura et al. | EP | 0845154 B1 | 11/1999 |
| 2005/0061636 A1 | 3/2005 | Frost et al. | EP | 0624354 B1 | 12/1999 |
| 2005/0064196 A1 | 3/2005 | Martin et al. | EP | 0582676 B1 | 3/2000 |
| 2005/0082139 A1 | 4/2005 | Ishikawa et al. | EP | 1063085 A1 | 12/2000 |
| 2005/0084390 A1 | 4/2005 | Ueno et al. | EP | 1 067 211 | 1/2001 |
| 2005/0089685 A1 | 4/2005 | Hamada et al. | EP | 0850126 B1 | 1/2001 |
| 2005/0100701 A1 | 5/2005 | Hamada et al. | EP | 1076087 | 2/2001 |
| 2005/0115744 A1 | 6/2005 | Griffin et al. | EP | 1078736 A1 | 2/2001 |
| 2005/0188942 A1 | 9/2005 | Hamada et al. | EP | 1109196 A1 | 6/2001 |
| | | | EP | 0778902 B1 | 9/2001 |
| | FOREIGN PATENT DOCUMENTS | | EP | 1 154 012 | 11/2001 |
| | | | EP | 0826790 B1 | 11/2001 |
| DE | 643 034 | 3/1937 | EP | 1034320 B1 | 12/2001 |

| | | | | | | |
|---|---|---|---|---|---|---|
| EP | 0850133 B1 | 1/2002 | | JP | 2001-93141 A2 | 4/2001 |
| EP | 0893677 B1 | 1/2002 | | JP | 2001-172766 A2 | 6/2001 |
| EP | 1184480 A2 | 3/2002 | | JP | 2001-192864 | 7/2001 |
| EP | 1190791 A3 | 4/2002 | | JP | 2001-269938 | 10/2001 |
| EP | 1219464 A2 | 7/2002 | | JP | 2001-280236 | 10/2001 |
| EP | 1 233 054 A1 | 8/2002 | | JP | 2002-265968 A2 | 9/2002 |
| EP | 0971812 B1 | 10/2002 | | JP | 2002-309912 | 10/2002 |
| EP | 1018291 B1 | 10/2002 | | JP | 2002-332571 | 11/2002 |
| EP | 1281513 A2 | 2/2003 | | JP | 2003-13163 | 1/2003 |
| EP | 1 300 608 | 4/2003 | | JP | 2003-13799 | 1/2003 |
| EP | 0950123 B1 | 5/2003 | | JP | 2003-25117 | 1/2003 |
| EP | 0882759 B1 | 6/2003 | | JP | 2003-28174 A2 | 1/2003 |
| EP | 1 338 641 | 8/2003 | | JP | 2003-88939 | 3/2003 |
| EP | 1340605 A1 | 9/2003 | | JP | 2003-113941 | 4/2003 |
| EP | 1365141 A1 | 11/2003 | | JP | 2003-147508 | 5/2003 |
| EP | 1083946 B1 | 12/2003 | | JP | 2003-214444 A | 7/2003 |
| EP | 1078736 B1 | 1/2004 | | JP | 2004-36788 A2 | 2/2004 |
| EP | 1378271 A1 | 1/2004 | | JP | 2005-68529 A2 | 3/2005 |
| EP | 0757615 B1 | 3/2004 | | RU | 2004586 C1 | 12/1993 |
| EP | 0842754 B1 | 3/2004 | | RU | 2153782 C1 | 7/2000 |
| EP | 1 411 145 | 4/2004 | | SU | 1770350 A1 | 10/1992 |
| EP | 0862395 B1 | 4/2004 | | WO | WO 89/06707 A1 | 7/1989 |
| EP | 1 418 353 A2 | 5/2004 | | WO | WO 89/06708 A1 | 7/1989 |
| EP | 1440775 A1 | 7/2004 | | WO | WO 8906338 A1 | 7/1989 |
| EP | 1445119 A1 | 8/2004 | | WO | WO 92/02602 | 2/1992 |
| EP | 1475557 A1 | 11/2004 | | WO | WO 9206843 A1 | 4/1992 |
| EP | 1481699 A1 | 12/2004 | | WO | WO 9219425 A2 | 11/1992 |
| EP | 1482190 A2 | 12/2004 | | WO | WO 93/21288 | 10/1993 |
| EP | 1498597 A1 | 1/2005 | | WO | WO 93/21289 | 10/1993 |
| EP | 1 510 594 A2 | 3/2005 | | WO | WO 9324828 A1 | 12/1993 |
| EP | 1311885 B1 | 3/2005 | | WO | WO 95/20253 A2 | 7/1995 |
| EP | 1512781 A2 | 3/2005 | | WO | WO 95/29044 A1 | 11/1995 |
| EP | 1183470 B1 | 4/2005 | | WO | WO 95/29273 A1 | 11/1995 |
| FR | 2 669 689 A1 | 5/1992 | | WO | WO 95/31584 A1 | 11/1995 |
| GB | 768226 | 2/1957 | | WO | WO 96/04485 A1 | 2/1996 |
| GB | 1005638 | 10/1988 | | WO | WO 96/05333 A1 | 2/1996 |
| GB | 2338716 | 12/1999 | | WO | WO 96/05942 A1 | 2/1996 |
| IE | 0990532 A1 | 3/2001 | | WO | WO 96/06961 A1 | 3/1996 |
| JP | 62-111106 | 5/1987 | | WO | WO 96/12389 A1 | 4/1996 |
| JP | 63-21209 A2 | 1/1988 | | WO | WO 96/24488 A1 | 8/1996 |
| JP | 63-288994 A2 | 11/1988 | | WO | WO 96/40446 A1 | 12/1996 |
| JP | 5-70879 A | 3/1993 | | WO | WO 97/07531 A1 | 2/1997 |
| JP | 5-36004 | 5/1993 | | WO | WO 97/10093 A1 | 3/1997 |
| JP | 5-42616 | 6/1993 | | WO | WO 97/10940 A1 | 3/1997 |
| JP | 6-264993 | 9/1994 | | WO | WO 97/14555 | 4/1997 |
| JP | 6-294307 A | 10/1994 | | WO | WO 97/16138 A1 | 5/1997 |
| JP | 7-63135 | 3/1995 | | WO | WO 98/02715 A1 | 1/1998 |
| JP | 7-90553 A | 4/1995 | | WO | WO 98/12994 A1 | 4/1998 |
| JP | 7-103238 A | 4/1995 | | WO | WO 98/13528 A1 | 4/1998 |
| JP | 07-118832 | 5/1995 | | WO | WO 98/47141 A1 | 10/1998 |
| JP | 7-41386 A2 | 10/1995 | | WO | WO 99/09547 A1 | 2/1999 |
| JP | 7-286696 | 10/1995 | | WO | WO 99/12404 A1 | 3/1999 |
| JP | 8-14014 | 1/1996 | | WO | WO 99/14512 A1 | 3/1999 |
| JP | 8-61499 | 3/1996 | | WO | WO 99/16371 A1 | 4/1999 |
| JP | 9-20961 A2 | 1/1997 | | WO | WO 99/22694 A2 | 5/1999 |
| JP | 52006318 | 1/1997 | | WO | WO 99/27157 A1 | 6/1999 |
| JP | 253770 A2 | 9/1997 | | WO | WO 99/29477 A1 | 6/1999 |
| JP | 10-088369 A2 | 4/1998 | | WO | WO 99/31557 A1 | 6/1999 |
| JP | 10-265790 | 10/1998 | | WO | WO 99/34385 A1 | 7/1999 |
| JP | 10-298440 A2 | 11/1998 | | WO | WO 99/46847 A1 | 9/1999 |
| JP | 11-22423 | 1/1999 | | WO | WO 99/54520 A1 | 10/1999 |
| JP | 11-190406 | 7/1999 | | WO | WO 99/54934 A1 | 10/1999 |
| JP | 11-292629 A2 | 10/1999 | | WO | WO 99/57743 A1 | 11/1999 |
| JP | 11-294118 | 10/1999 | | WO | WO 99/62077 A1 | 12/1999 |
| JP | 11-333773 A2 | 12/1999 | | WO | WO 99/62572 A1 | 12/1999 |
| JP | 2000-88104 | 3/2000 | | WO | WO 00/22613 A1 | 4/2000 |
| JP | 2000-119843 | 4/2000 | | WO | WO 00/24554 A1 | 5/2000 |
| JP | 2000-504089 | 4/2000 | | WO | WO 00/25410 A1 | 5/2000 |
| JP | 2000-297373 | 10/2000 | | WO | WO 00/28142 A1 | 5/2000 |
| JP | 2000-327484 | 11/2000 | | WO | WO 00/33051 A1 | 6/2000 |
| JP | 2000-339083 | 12/2000 | | WO | WO 00/44032 A1 | 7/2000 |
| JP | 2001-62605 | 3/2001 | | WO | WO 00/35000 A1 | 8/2000 |
| JP | 2001-64005 | 3/2001 | | WO | WO 00/47402 A1 | 8/2000 |

| | | |
|---|---|---|
| WO | WO 00/55385 A1 | 9/2000 |
| WO | WO 00/56127 A1 | 9/2000 |
| WO | WO 00/56393 A1 | 9/2000 |
| WO | WO 00/62327 A2 | 10/2000 |
| WO | WO 00/68451 A2 | 11/2000 |
| WO | WO 00/75517 A1 | 12/2000 |
| WO | WO 00/78504 A1 | 12/2000 |
| WO | WO 01/05917 | 1/2001 |
| WO | WO 01/006033 A1 | 2/2001 |
| WO | WO 01/14736 A1 | 3/2001 |
| WO | WO 01/14745 A1 | 3/2001 |
| WO | WO 01/26862 A1 | 4/2001 |
| WO | WO 01/37631 A2 | 5/2001 |
| WO | WO 01/40537 A1 | 6/2001 |
| WO | WO 01/47451 A1 | 7/2001 |
| WO | WO 01/59544 A2 | 8/2001 |
| WO | WO 01/61182 | 8/2001 |
| WO | WO 01/61719 A1 | 8/2001 |
| WO | WO 01/62372 A1 | 8/2001 |
| WO | WO 01/63639 A1 | 8/2001 |
| WO | WO 01/67834 A1 | 9/2001 |
| WO | WO 01/79583 A2 | 10/2001 |
| WO | WO 01/80224 A2 | 10/2001 |
| WO | WO 02/006875 A1 | 1/2002 |
| WO | WO 02/13188 A1 | 2/2002 |
| WO | WO 02/24601 A1 | 3/2002 |
| WO | WO 02/024603 A1 | 3/2002 |
| WO | WO 02/24970 A2 | 3/2002 |
| WO | WO 02/32625 A2 | 4/2002 |
| WO | WO 02/44440 A1 | 6/2002 |
| WO | WO 02/054454 A2 | 7/2002 |
| WO | WO 02/062714 A2 | 8/2002 |
| WO | WO 02/073021 | 9/2002 |
| WO | WO 02/080996 A1 | 10/2002 |
| WO | WO 02/085237 A2 | 10/2002 |
| WO | WO 2/090461 A1 | 11/2002 |
| WO | WO 02/097289 A1 | 12/2002 |
| WO | WO 03/00978 A1 | 2/2003 |
| WO | WO 03/013990 A1 | 2/2003 |
| WO | WO 03/020329 A1 | 3/2003 |
| WO | WO 03/021731 A1 | 3/2003 |
| WO | WO 03/031543 A2 | 4/2003 |
| WO | WO 03/046508 A3 | 6/2003 |
| WO | WO 03/054876 A1 | 7/2003 |
| WO | WO 03/076309 A2 | 9/2003 |
| WO | WO 03/078679 A1 | 9/2003 |
| WO | WO 03/091758 A2 | 11/2003 |
| WO | WO 03/095009 A1 | 11/2003 |
| WO | WO 03/105134 A1 | 12/2003 |
| WO | WO 2004/001804 A2 | 12/2003 |
| WO | WO 2004/004998 A1 | 1/2004 |
| WO | WO 2004/019809 A2 | 3/2004 |
| WO | WO 2004/024206 A1 | 3/2004 |
| WO | WO 2004/026359 A1 | 4/2004 |
| WO | WO 2004/026500 A2 | 4/2004 |
| WO | WO 2004/036169 A1 | 4/2004 |
| WO | WO 2004/036292 A2 | 4/2004 |
| WO | WO 2004/038701 A1 | 5/2004 |
| WO | WO 2004/043631 A1 | 5/2004 |
| WO | WO 2004/048126 A2 | 6/2004 |
| WO | WO 2004/067466 A1 | 8/2004 |
| WO | WO 2004/068530 A1 | 8/2004 |
| WO | WO 2004/071670 A1 | 8/2004 |
| WO | WO 2004/072959 A2 | 8/2004 |
| WO | WO 2004/078424 A2 | 9/2004 |
| WO | WO 2004/084773 A1 | 10/2004 |
| WO | WO 2004/088113 A1 | 10/2004 |
| WO | WO 2005/010596 A2 | 2/2005 |
| WO | WO 2005/011744 A2 | 2/2005 |
| WO | WO 2005/014760 A1 | 2/2005 |
| WO | WO 2005/014882 A1 | 2/2005 |
| WO | WO 2005/016620 A2 | 2/2005 |
| WO | WO 2005/021851 A1 | 3/2005 |
| WO | WO 2005/025844 A1 | 3/2005 |
| WO | WO 2005/034791 A1 | 4/2005 |
| WO | WO 2005/037144 A2 | 4/2005 |
| WO | WO 2005/037985 A2 | 4/2005 |
| WO | WO 2005/040451 A1 | 5/2005 |
| WO | WO 2005/042064 A1 | 5/2005 |
| WO | WO 2005/047737 A1 | 5/2005 |

OTHER PUBLICATIONS

U.S. Appl. No. 10/914,506, filed Aug. 10, 2004, Nishimura et al.
U.S. Appl. No. 10/468,713, filed Aug. 22, 2003, Mabuchi et al.
"Petroleum products—Determination of base number—Perchloric acid potentiometric titration method", International Organization of Standardization (ISO 3771), Aug. 15, 1994, pp. 1-8.
"Standard Test Method for Separation of Representative Aromatics and Nonaromatics Fractions of High-Boiling Oils by Elution Chromatography", American Society for Testing and Materials (ASTM D 2549), 1995, pp. 895-900.
Von Dr.-Ing et al., "Neuartige Laufflächen-Schutzverfahren für Kolben von Verbrennungsmotoren", VDI-Zeitschrift Bd., Apr. 18, 1942, pp. 245-247, vol. 86, No. 15-16.
"Aluminium Alloys Castings", Japanese Industrial Standard (JIS H 5202), 1999, pp. 1-18.
"Geometrical Product Specifications (GPS)—Surface texture: Profile method—Terms, definitions and surface texture parameters", Japanese Industrial Standard (JIS B 0601) Machine Elements, 2003, pp. 263-287.
"Grey iron castings", Japanese Industrial Standard (JIS G 5501), pp. 2075-2077.
Y. Yang et al., "Diamond-Like Carbon Film and Its Applications," Aerospace Materials and Technology, vol. 1, 1996, p. 13-16.
R. Ni et al., "Latest Development of Hydrogen-Free Diamond-Like Carbon Films," Vacuum Science and Technology (China), May 6, 2003, pp. 176-186.
Gåhlin, Rickard et al., "ME-C:H Coatings in Motor Vehicles," *WEAR* 249, 2001, pp. 302-309.
Hershberger, J., et al., "Evaluation of DLC Coatings for Spark-Ignited, Direct-Injected Fuel Systems," *Surface & Coatings Technology*, 179, 2004, pp. 237-244.
Hershberger, J, et al., "Friction and Wear Behavior of Near-Frictionless Carbon Coatings in Formulated Gasolines," *Surface & Coating Technology*, 183, 2004, pp. 111-117.
Kovalchenko, A., et al., "Friction and Wear Performance of Low-Friction Carbon Coatings Under Oil Lubrication," Energy Technology Div., Argonne National Laboratory.
Ajayi, O., et al., "Effect of Carbon Coating on Scuffing Performance in Diesel Fuels," *Tribology Transactions*, vol. 44, 2001, pp. 298-304.
Ajayi, O., et al., Effect of Thin-Film Coating on Wear in EGR-Contaminated Oil, Energy Technology Div., Argonne National Laboratory.
Fujimori, N., et al., "Characterization of Conducting Diamond Films," *Vacuum*, vol. 36, Nos. 1-3, 1996, pp. 99-102.
Patent Literature Search Report, Bawa Biotechnology Consulting, LLC, Jun. 3, 2005, pp. (201 pages).
"Aluminium Alloy Die Castings," Japanese Industrial Standard (JIS H 5302), 2000, pp. 1-12.
Japanese Industrial Standard, "Aluminium Alloy Castings", JIS H 5202, 1999, pp. 1910, 1911 and 1636-1647.
"Aluminum Alloy Die Castings," JIS H5302 (2000), pp. 1670-1681.
"Assessment of 2nd to 5th Order Irregularities of Surface Configuration by Means of Sections of Surfaces Definitions Relating to Reference System and Dimensions," DIN 4762, UDC 621-288:001.4 (Aug. 1960), pp. 1-4.
API Motor Oil Guide, "Which Oil is Right For You", American Petroleum Institute, Copyright 2002.
"Carbon Steels for Machine Structural Use", Japanese Industrial Standard (JIS G 4051), 1979, pp. 1381-1383.
"Carbon Steels for Machine Structural Use", Japanese Industrial Standard (JIS G 4051), 1979, pp. 1-10.
"Chromium Molybdenum Steels," Japanese Industrial Standard (JIS G 4105), 1979, pp. 1-11 (with Translation).

"Chromium Steels," Japanese Industrial Standard (JIS G 4104), 1979, pp. 1-9.

D.G. Watson et al., "Engineering Drawing Practice," XP002261300, University of Hertfordshire, Sep. 1991, pp. 29, Figure 38.

Database WPI, Nov. 28, 2000, Derwent Publications, Ltd., AN 2000640583, XP002240184, JP 2000-327484, Nov. 28, 2000.

Dr. Marx, "Surfaces and Contact Mechanics", XP-002233233, Google, Retrieved from the Internet, Mar. 3, 2003, pp. 1-18.

Engine Oil Viscosity Classification—SAE J300 revised Apr. 1997, p. 133.

"Geometrical Product Specifications (GPS)—Surface Texture: Profile Method—Terms, Defintions and Surface Texture Parameters," International Standard, ISO 4287, TC 213 (1997), pp. 1-25.

Japanese Industrial Standard, "High Carbon Chromium Bearing Steels", JIS G 4805, 1999, pp. 1-31 (with translation).

International Standard "Application of Carbides for Machining by Chip Removal—Designation of the Main Groups of Chip Removal and Groups of Application," ISO 513, (1975), pp. 67-69.

Japanese Industrial Standard, "Structural Steels with Specified Hardenability Bands", JIS G 4052, 1979, pp. 2414, 2415, 1390-1403, 1410 and 1411.

JIS Japanese Industrial Standard; "Surface Roughness—Definitions and Designation"; JIS B 0601; 1994. (w/Translation).

JIS Japanese Industrial Standard; "Vickers Hardness Test—Test Method"; JIS Z 2244; 1998; (w/Translation).

Japanese Industrial Standard, 2001, No. B 0601.

K. Holmberg et al., "Tribological Characteristics of Diamond-like Carbon Coatings," VTT Symposium, Technical Research Centre of Finland, XP000570636, 1994, pp. 24-238.

Kano et al., "Friction Characteristics of a Hard Carbon Film in Engine Oil, (No. 2) (Surface Analysis Result of Sliding Surface)," Tribology Congress 1999, 5, pp. 11-12.

M. Kano et al., "The Effect of ZDDP and MODTC Additives on Friction Properties of DLC and Steel Cam Follower in Engine Oil", Abstracts of Papers from 2nd World Tribology Congress, Sep. 3-7, 2001, p. 342.

Patent Abstracts of Japan, vol. 1996, No. 09, Sep. 30, 1996, JP 08-128448, May 21, 1996.

Patent Abstracts of Japan, vol. 2000, No. 1, Jan. 31, 2000, JP 11-287329, Oct. 19, 1999.

Patent Abstracts of Japan, vol. 2000, No. 9, Oct. 13, 2000, JP 2000-170768, Jun. 20, 2000.

PCT/IB2004/002552.

"Stainless Steel Bars", Japanese Industrial Standard (JIS G 4303), pp. 1457-1477.

"Standard Practice for Codification of Certain Nonferrous Metals and Alloys, Cast and Wrought1", ASTM International, Designation: B 275-02, Jun. 2002, pp. 1-7.

"Standard Test Method for Calibration and Operation of the Falex Block-on-Ring Friction and Wear Testing Machine", ASTM Designation: D2714—88, Jan. 1989, pp. 383-386.

Steve J. Bull et al., "High-Performance Diamond and Diamond-like Coatings", JOM, Apr. 1995, pp. 16-19, vol. 47, No. 4, XP 000500980.

Patent Abstracts of Japan, vol. 2003, No. 12, Dec. 5, 2003, JP 2004-155891, Jun. 3, 2004.

U.S. Appl. No. 10/911,741, filed May 5, 2004, Ueno.

Ronkainen, Helena, "Tribological Properties of Hydrogenated and Hydrogen-Free Diamond-Like Carbon Coatings," Disseration for the Degree of Doctor of Science in Technology, VTT Publications No. 434.

\* cited by examiner

FIGURE
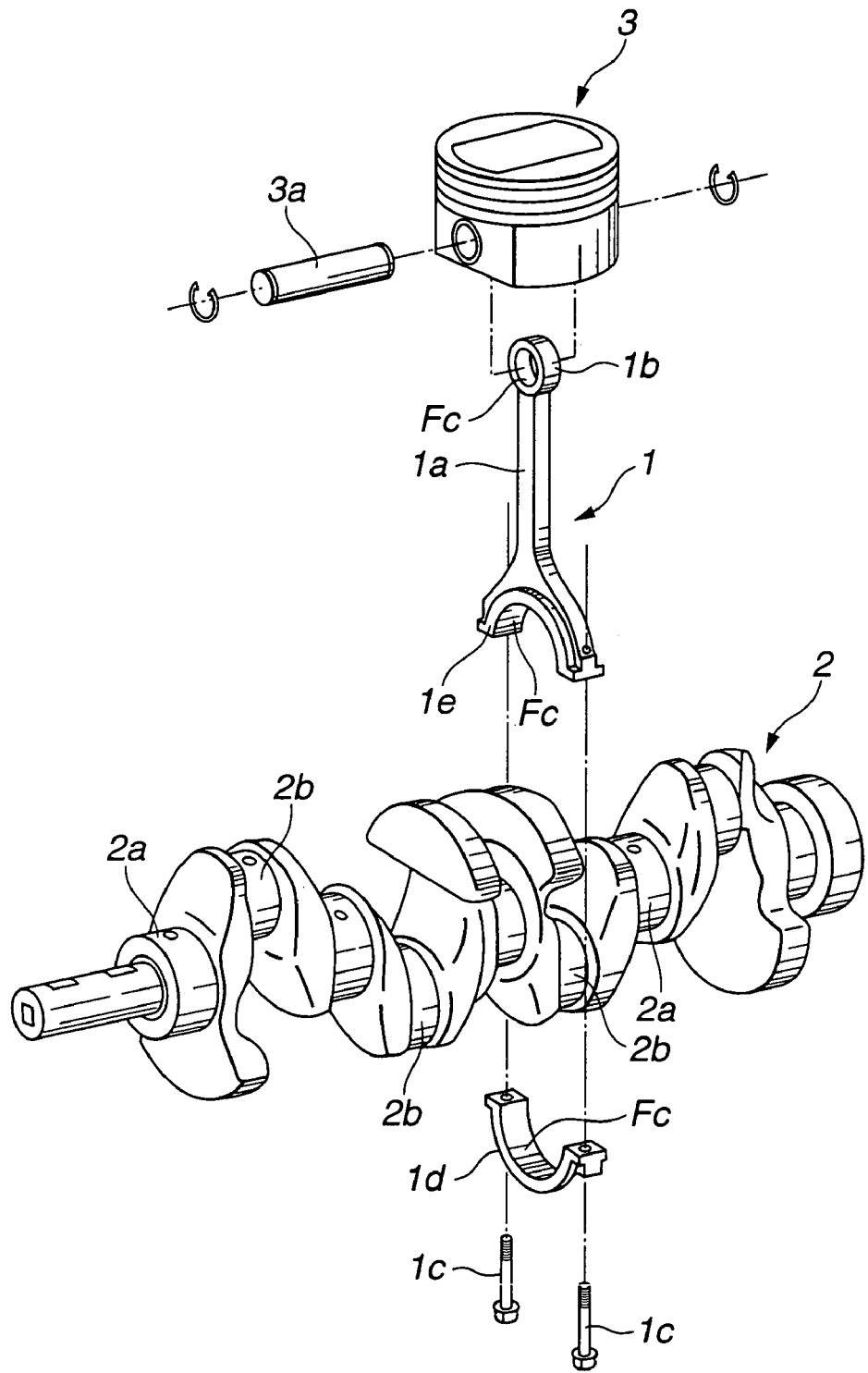

US 7,284,525 B2

STRUCTURE FOR CONNECTING PISTON TO CRANKSHAFT

CROSS-REFERENCE TO RELATED APPLICATIONS

The present application is related to the following applications: U.S. patent application Ser. No. 09/545,181 (based on Japanese Patent Application No. 11-102205 filed on Apr. 9, 1999); U.S. patent application Ser. No. 10/468,713, which is the national phase of PCT Application No. JP02/10057 (based on Japanese Patent Application No. 2001-117680 filed on Apr. 17, 2001); U.S. patent application Ser. No. 10/355,099 (based on Japanese Patent Application No. 2002-45576 filed on Feb. 22, 2002); U.S. patent application Ser. No. 10/682,559 (based on Japanese Patent Application No. 2002-302205 filed on Oct. 16, 2002); and U.S. patent application Ser. No. 10/692,853 (based on Japanese Patent Application No. 2002-322322 filed on Oct. 16, 2002).

BACKGROUND OF THE INVENTION

The invention relates to a structure for connecting a piston to a crankshaft via a connecting rod in a reciprocating engine so as to convert a reciprocating motion of the piston into a rotational motion of the crankshaft.

For cost reduction and reliability assurance, a forged connecting rod is generally used to connect a piston to a crankshaft in an internal combustion engine. In recent years, several active efforts have been made to achieve the weight reduction of various engine moving parts in order to increase engine power and fuel efficiency. It is thus desired to provide a connecting rod with a reduced weight and high strength. In view of the foregoing, Japanese Laid-Open Patent Publication No. 5-070879 proposes a connecting rod made of an aluminum alloy material for use in a relatively low-load engine.

SUMMARY OF THE INVENTION

The connecting rod has a crankpin bearing and a piston pin bearing rotatably engaged with a crankpin and a piston pin, respectively, under lubrication, so as to establish a connection between the crankshaft and the piston pin. The sliding friction between the crankpin and the crankpin bearing and between the piston pin and the piston pin bearing is at the highest level in the engine. As the crankpin and the piston pin are generally made of cast iron or forged steel, there arises a case that the crankpin and piston pin bearings of the aluminum alloy connecting rod become deformed under such severe sliding conditions. The deformed portions of the connecting rod bearings are subjected to poor lubrication or high local surface pressure, resulting in abnormal wear due to adhesion. For these reasons, it is important to reduce the sliding friction between the crankpin and the crankpin bearing and between the piston pin and the piston pin bearing in order to improve engine performance and fuel efficiency. However, there has been a limitation to friction reduction in the earlier technology.

It is therefore an object of the present invention to provide a structure for connecting a piston to a crankshaft in an internal combustion engine, which includes a connecting rod made of an aluminum alloy material and having a crankpin bearing and a piston pin bearing slidably engaged with a crankpin and a piston pin, respectively, so as to reduce the sliding friction between the crankpin and the crankpin bearing and between the piston pin and the piston pin bearing and thereby improve engine performance, durability/reliability and fuel efficiency.

As a result of extensive research on the materials of and the surface treatment processes for a connecting rod, a crankshaft and a piston pin and on the composition of a lubricating oil therefor, it has been found by the present inventors that the formation of thin coating films of low-hydrogen-content hard carbon on at least one of sliding surfaces between the connecting rod and crankpin and at least one of sliding surfaces between the connecting rod and piston pin allows a significant improvement in low-friction characteristics of the connecting rod, crankpin and piston pin especially in the presence of a specific lubricating oil. The present invention is based on the above finding.

According to an aspect of the invention, there is provided a structure for connecting a piston to a crankshaft in an internal combustion engine, comprising: a piston pin fitted into the piston; a crankpin integral with the crankshaft; and a connecting rod having a piston pin bearing portion slidably engaged with an outer cylindrical portion of the piston pin and a crankpin bearing portion slidably engaged with an outer cylindrical portion of the crankpin, wherein at least one of the piston pin bearing portion of the connecting rod and the outer cylindrical portion of the piston pin and at least one of the crankpin bearing portion of the connecting rod and the outer cylindrical portion of the crankpin have hard carbon coatings formed thereon with a hydrogen content of 20 atomic % or less.

The other objects and features of the invention will also become understood from the following description.

BRIEF DESCRIPTION OF THE DRAWING

FIGURE shows a structure for connecting a piston to a crankshaft according to one exemplary embodiment of the present invention.

DESCRIPTION OF THE EMBODIMENTS

The present invention will be described below in detail. In the following description, all percentages (%) are by mass unless otherwise specified.

According to an embodiment of the present invention, there is provided a piston-crankshaft connecting structure for an internal combustion engine, as shown in FIGURE, including connecting rod 1, crankshaft 2, piston 3 and piston pin 3a.

Connecting rod 1 is made of an aluminum alloy material, and includes a rod body having pole portion 1a and small end portion 1b (as a piston pin bearing portion) formed at one end of pole portion 1a, and a cap 1d fixed to the other end of pole portion 1a with bolts 1c to form big end portion 1e (as a crankpin bearing portion).

Crankshaft 2 has crank journal 2a rotatably supported on a crankcase (not shown) of the engine, and crankpin 2b integral with crankshaft 2 and rotatably engaged in big end portion 1e of connecting rod 1.

Piston pin 3a is rotatably engaged in small end portion 1b of connecting rod 1 and fitted in a piston pin boss of piston 3.

With such an arrangement, connecting rod 1 connects piston 3 to crankshaft 2 in such a manner as to covert a reciprocating motion of piston 3 into a rotational motion of crankshaft 2.

In the present embodiment, the inner cylindrical surfaces of small and big end portions 1b and 1e of connecting rod 1 are covered with thin coatings Fc of hard carbon having high hardness and adhesion resistance. The coefficients of friction between connecting rod 1 and crankpin 2b and between connecting rod 1 and piston pin 3a become thus lowered in the presence of the following lubricating oil. Also, the scuff/wear resistance of connecting rod 1 becomes increased. This leads to improvement in the performance, durability/reliability and fuel efficiency of the engine. Alternatively, hard carbon coatings Fc may be applied to outer cylindrical surfaces of crankpin 2b and piston pin 3a instead of being applied to the inner cylindrical surfaces of small and big end portions 1b and 1e of connecting rod 1, or be applied to all of the inner cylindrical surfaces of small and big end portions 1b and 1d of connecting rod 1 and the outer cylindrical surface of crankpin 2b and the outer cylindrical surface of piston pin 3a.

Hard carbon coatings Fc are generally made of an amorphous diamond-like carbon (DLC) material in which carbon exists in both $sp^2$ and $sp^3$ hybridizations to have a composite structure of graphite and diamond. Specific examples of the diamond-like carbon material include hydrogen-free amorphous carbon (a-c), hydrogen-containing amorphous carbon (aC:H) and/or metal-containing diamond-like carbon (MeC) that contains as a part a metal element of titanium (Ti) or molybdenum (Mo).

The coefficient of friction between connecting rod 1 and crankpin 2b and between connecting rod 1 and piston pin 3a increases with the hydrogen content of hard carbon coatings Fc. The hydrogen content of hard carbon coatings Fc is thus preferably controlled to 20 atomic % or less, more preferably 10 atomic % or less, still more preferably 5 atomic % or less, most preferably 1.0 atomic % or less, in order for hard carbon coatings Fc to attain a sufficiently low friction coefficient and stable sliding characteristics for connecting rod 1, crankpin 2b and piston pin 3a.

Further, hard carbon coatings Fc can be formed by a chemical vapor deposition (CVD) process or a physical vapor deposition (PVD) process. In order to decrease the hydrogen contents of hard carbon coatings Fc effectively, it is preferable to form hard carbon coatings Fc by the PVD process, such as arc ion plating, in which the coating atmosphere contains substantially no hydrogen and hydrogen-containing compounds. It may be further desirable to bake a reaction chamber and holding fixtures and to clean the inner cylindrical surfaces of small and big end portions 1b and 1e of connecting rod 1 and/or the outer cylindrical surfaces of crankpin 2b and piston pin 3a, before the formation of hard carbon coatings Fc, so as to decrease the hydrogen contents of hard carbon coatings Fc.

The lubricating oil is supplied to a sliding interface between connecting rod 1 and crankpin 2b and a sliding interface between connecting rod 1 and piston pin 3a, and is preferably prepared by blending a base oil with at least one of an ashless fatty-ester friction modifier and an ashless aliphatic-amine friction modifier in order to obtain a large friction reducing effect.

The base oil is not particularly limited, and can be selected from any commonly used lube base compounds, such as mineral oils, synthetic oils, fats and mixtures thereof.

Specific examples of the mineral oils include normal paraffins and paraffin-based or naphthene-based oils each prepared by extracting lubricating oil fractions from petroleum by atmospheric or reduced-pressure distillation, and then, purifying the obtained lubricating oil fractions with at least one of the following treatments: solvent deasphalting, solvent extraction, hydrocracking, solvent dewaxing, hydro-refining, surfuric acid treatment and clay refining. Although the lubricating oil fraction is generally purified by hydro- or solvent-refining, it is preferable to use the mineral oil prepared by purifying the lubricating oil fraction with deep hydrocraking or GTL (Gas-to-Liquids) wax isomerization for reduction of an aromatics content in the base oil.

Specific examples of the synthetic oils include: poly-α-olefins (PAO), such as 1-octene oligomer, 1-decene oligomer and ethylene-propylene oligomer, and hydrogenated products thereof; isobutene oligomer and hydrogenated product thereof; isoparaffines; alkylbenzenes; alkylnaphthalenes; diesters, such as ditridecyl glutarate, dioctyl adipate, diisodecyl adipate, ditridecyl adipate and dioctyl sebacate; polyol esters, such as trimethylolpropane esters (e.g. trimethylolpropane caprylate, trimetylolpropane pelargonate and trimethylolpropane isostearate) and pentaerythritol esters (e.g. pentaerythritol-2-ethyl hexanoate and pentaerythritol pelargonate); polyoxyalkylene glycols; dialkyl diphenyl ethers; and polyphenyl ethers. Among others, preferred are poly-α-olefins, such as 1-octene oligomer and 1-decene oligomer, and hydrogenated products thereof.

The above base oil compounds can be used alone or in combination thereof. In the case of using as the base oil a mixture of two or more base oil compounds, there is no particular limitation to the mixing ratio of the base oil compounds.

The sulfur content of the base oil is not particularly restricted, and is preferably 0.2% or less, more preferably 0.1% or less, still more preferably 0.05% or lower, based on the total mass of the base oil. It is especially desirable to use the hydro-refined mineral oil or the synthetic oil, because the hydro-refined mineral oil and the synthetic oil each have a sulfur content of not more than 0.005% or substantially no sulfur content (not more than 5 ppm).

The aromatics content of the base oil is not also particularly restricted. Herein, the aromatics content is defined as the amount of an aromatics fraction determined according to ASTM D2549. In order for the lubricating oil to provide low-friction characteristics suitably for use in an internal combustion engine over an extended time period, the aromatic content of the base oil is preferably 15% or less, more preferably 10% or less, and still more preferably 5% or less, based on the total mass of the base oil. The lubricating oil undesirably deteriorates in oxidation stability when the aromatics content of the base oil exceeds 15%.

The kinematic viscosity of the base oil is not particularly restricted. To use the lubricating oil in an internal combustion engine, the kinematic viscosity of the base oil is preferably 2 mm$^2$/s or higher, more preferably 3 mm$^2$/s or higher, and at the same time, is preferably 20 mm$^2$/s or lower, more preferably 10 mm$^2$/s or lower, still more preferably 8 mm$^2$/s or lower, as measured at 100° C. When the kinematic viscosity of the base oil is less than 2 mm$^2$/s at 100° C., there is a possibility that the lubricating oil fails to provide sufficient wear resistance and causes a considerable evaporation loss. When the kinematic viscosity of the base oil exceeds 20 mm$^2$/s at 100° C., there is a possibility that the lubricating oil fails to provide low-friction characteristics and deteriorates in low-temperature properties.

In the case of using two or more base oil compounds in combination, it is not necessary to limit the kinematic viscosity of each base oil compound to within the above-specified range so long as the kinematic viscosity of the mixture of the base oil compounds at 100° C. is in the specified range.

The viscosity index of the base oil is not particularly restricted, and is preferably 80 or higher, more preferably 100 or higher, most preferably 120 or higher, to use the lubricating oil suitably in an internal combustion engine. When the base oil has a higher viscosity index, the lubricating oil becomes less consumed and attains good low-temperature viscosity properties.

As the fatty-ester friction modifier and the aliphatic-amine friction modifier, there may be used fatty acid esters and aliphatic amines each having $C_6$-$C_{30}$ straight or branched hydrocarbon chains, preferably $C_8$-$C_{24}$ straight or branched hydrocarbon chains, more preferably $C_{10}$-$C_{20}$ straight or branched hydrocarbon chains. When the carbon number of the hydrocarbon chain of the friction modifier is not within the range of 6 to 30, there arises a possibility of failing to produce a desired friction reducing effect. Specific examples of the $C_6$-$C_{30}$ straight or branched hydrocarbon chain include: alkyl groups, such as hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl, tetracosyl, pentacosyl, hexacosyl, heptacosyl, octacosyl, nonacosyl and triacontyl; and alkenyl groups, such as hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, icosenyl, heneicosenyl, docosenyl, tricosenyl, tetracosenyl, pentacosenyl, hexacosenyl, heptacosenyl, octacosenyl, nonacosenyl and triacontenyl. The above alkyl and alkenyl groups include all possible isomers.

The fatty acid esters are preferably exemplified by esters of fatty acids having the above $C_6$-$C_{30}$ hydrocarbon groups and monohydric or polyhydric aliphatic alcohols. Specific examples of such fatty acid esters include glycerol monooleate, glycerol diooleate, sorbitan monooleate and sorbitan diooleate.

The aliphatic amines are preferably exemplified by aliphatic monoamines and alkylene oxide adducts thereof, aliphatic polyamines, imidazolines and derivatives thereof each having the above $C_6$-$C_{30}$ hydrocarbon groups. Specific examples of such aliphatic amines include: aliphatic amine compounds, such as laurylamine, lauryldiethylamine, lauryldiethanolamine, dodecyldipropanolamine, palmitylamine, stearylamine, stearyltetraethylenepentamine, oleylamine, oleylpropylenediamine, oleyldiethanolamine and N-hydroxyethyloleylimidazolyne; alkylene oxide adducts of the aliphatic amine compounds, such as N,N-dipolyoxyalkylene-N-alkyl or alkenyl ($C_6$-$C_{28}$) amines; and acid-modified compounds prepared by reacting the aliphatic amine compounds with $C_2$-$C_{30}$ monocarboxylic acids (such as fatty acids) or $C_2$-$C_{30}$ polycarboxylic acids (such as oxalic acid, phthalic acid, trimellitic acid and pyromellitic acid) so as to neutralize or amidate the whole or part of the remaining amino and/or imino groups. Above all, N,N-dipolyoxyethylene-N-oleylamine is preferably used.

The amount of the fatty-ester friction modifier and/or the aliphatic-amine friction modifier contained in the lubricating oil is not particularly restricted, and is preferably 0.05 to 3.0%, more preferably 0.1 to 2.0%, and most preferably 0.5 to 1.4%, based on the total mass of the lubricating oil. When the amount of the fatty-ester friction modifier and/or the aliphatic-amine friction modifier in the lubricating oil is less than 0.05%, there is a possibility of failing to obtain a sufficient friction reducing effect. When the amount of the fatty-ester friction modifier and/or the aliphatic-amine friction modifier in the lubricating oil exceeds 3.0%, there is a possibility that the solubility of the friction modifier or modifiers in the base oil becomes so low that the lubricating oil deteriorates in storage stability to cause precipitations.

The lubricating oil may preferably include polybutenyl succinimide and/or a derivative thereof.

As the polybutenyl succinimide, there may be used compounds represented by the following general formulas (1) and (2).

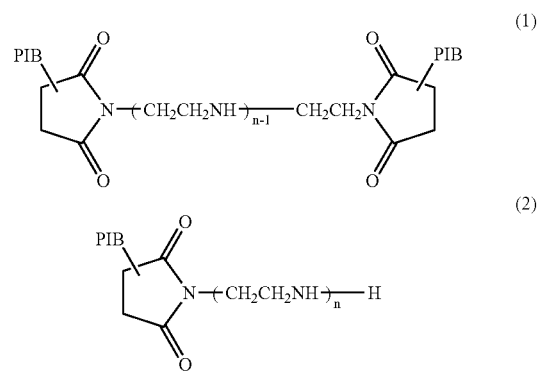

In the formulas (1) and (2), PIB represents a polybutenyl group derived from polybutene having a number-average molecular weight of 900 to 3500, preferably 1000 to 2000, that can be prepared by polymerizing high-purity isobutene or a mixture of 1-butene and isobutene in the presence of a boron fluoride catalyst or aluminum chloride catalyst. When the number-average molecular weight of the polybutene is less than 900, there is a possibility of failing to provide a sufficient detergent effect. When the number-average molecular weight of the polybutene exceeds 3500, the polybutenyl succinimide tends to deteriorate in low-temperature fluidity. The polybutene may be purified, before used for the production of the polybutenyl succinimide, by removing trace amounts of fluorine and chlorine residues resulting from the above polybutene production catalyst with any suitable treatment (such as adsorption process or washing process) in such a way as to control the amount of the fluorine and chlorine residues in the polybutene to 50 ppm or less, desirably 10 ppm or less, more desirably 1 ppm or less.

Further, n represents an integer of 1 to 5, preferably 2 to 4, in the formulas (1) and (2) in the formulas (1) and (2) in view of the detergent effect.

The production method of the polybutenyl succinimide is not particularly restricted. For example, the polybutenyl succinimide can be prepared by reacting a chloride of the polybutene, or the polybutene from which fluorine and chlorine residues are sufficiently removed, with maleic anhydride at 100 to 200° C. to form polybutenyl succinate, and then, reacting the thus-formed polybutenyl succinate with polyamine (such as diethylene triamine, triethylene tetramine, tetraethylene pentamine or pentaethylene hexamine).

As the polybutenyl succinimide derivative, there may be used boron- or acid-modified compounds obtained by reacting the polybutenyl succinimides of the formula (1) or (2) with boron compounds or oxygen-containing organic compounds so as to neutralize or amidate the whole or part of the remaining amino and/or imide groups. Among others, boron-containing polybutenyl succinimides, especially boron-containing bis(polybutenyl)succinimide, are preferred. The content ratio of nitrogen to boron (B/N) by mass in the boron-containing polybutenyl succinimide compound is usually 0.1 to 3, preferably 0.2 to 1.

The boron compound used for producing the polybutenyl succinimide derivative can be a boric acid, a borate or a boric acid ester. Specific examples of the boric acid include orthoboric acid, metaboric acid and tetraboric acid. Specific examples of the borate include: ammonium salts, such as ammonium borates, e.g., ammonium metaborate, ammonium tetraborate, ammonium pentaborate and ammonium octaborate. Specific examples of the boric acid ester include: esters of boric acids and alkylalcohols (preferably $C_1$-$C_6$ alkylalcohols), such as monomethyl borate, dimethyl borate, trimethyl borate, monoethyl borate, diethyl borate, triethyl borate, monopropyl borate, dipropyl borate, tripropyl borate, monobutyl borate, dibutyl borate and tributyl borate.

The oxygen-containing organic compound used for producing the polybutenyl succinimide derivative can be any of $C_1$-$C_{30}$ monocarboxylic acids, such as formic acid, acetic acid, glycolic acid, propionic acid, lactic acid, butyric acid, valeric acid, caproic acid, enanthic acid, caprylic acid, pelargonic acid, capric acid, undecylic acid, lauric acid, tridecanoic acid, myristic acid, pentadecanoic acid, palmitic acid, margaric acid, stearic acid, oleic acid, nonadecanoic acid and eicosanoic acid; $C_2$-$C_{30}$ polycarboxylic acids, such as oxalic acid, phthalic acid, trimellitic acid and pyromellitic acid, and anhydrides and esters thereof; $C_2$-$C_6$ alkylene oxides; and hydroxy(poly)oxyalkylene carbonates.

The amount of the polybutenyl succinimide and/or polybutenyl succinimide derivative contained in the lubricating oil is not particularly restricted, and is preferably 0.1 to 15%, more preferably 1.0 to 12%, based on the total mass of the lubricating oil. When the amount of the polybutenyl succineimide and/or polybutenyl succinimide derivative in the lubricating oil is less than 0.1%, there is a possibility of failing to attain a sufficient detergent effect. When the amount of the polybutenyl succineimide and/or polybutenyl succinimide derivative in the lubricating oil exceeds 15%, the lubricating oil may deteriorate in demulsification ability. In addition, it is uneconomical to add such a large amount of the polybutenyl succineimide and/or polybutenyl succinimide derivative in the lubricating oil.

Further, the lubricating oil may preferably include zinc dithiophosphate.

As the zinc dithiophosphate, there may be used compounds represented by the following general formula (3).

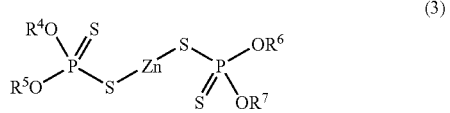

(3)

In the formula (3), $R^4$, $R^5$, $R^6$ and $R^7$ each represent $C_1$-$C_{24}$ hydrocarbon groups. The $C_1$-$C_{24}$ hydrocarbon group is preferably a $C_1$-$C_{24}$ straight- or branched-chain alkyl group, a $C_3$-$C_{24}$ straight- or branched-chain alkenyl group, a $C_5$-$C_{13}$ cycloalkyl or straight- or branched-chain alkylcycloalkyl group, a $C_6$-$C_{18}$ aryl or straight- or branched-chain alkylaryl group, or a $C_7$-$C_{19}$ arylalkyl group. The above alkyl group or alkenyl group can be primary, secondary or tertiary. Specific examples of $R^4$, $R^5$, $R^6$ and $R^7$ include: alkyl groups, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl and tetracosyl; alkenyl groups, such as propenyl, isopropenyl, butenyl, butadienyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl (oleyl), nonadecenyl, icosenyl, heneicosenyl, docosenyl, tricosenyl and tetracosenyl; cycloalkyl groups, such as cyclopentyl, cyclohexyl and cycloheptyl; alkylcycloalkyl groups, such as methylcyclopentyl, dimethylcyclopentyl, ethylcyclopentyl, propylcyclopentyl, ethylmethylcyclopentyl, trimethylcyclopentyl, diethylcyclopentyl, ethyldimethylcyclopentyl, propylmethylcyclopentyl, propylethylcyclopentyl, di-propylcyclopentyl, propylethylmethylcyclopentyl, methylcyclohexyl, dimethylcyclohexyl, ethylcyclohexyl, propylcyclohexyl, ethylmethylcyclohexyl, trimethylcyclohexyl, diethylcyclohexyl, ethyldimethylcyclohexyl, propylmethylcyclohexyl, propylethylcyclohexyl, di-propylcyclohexyl, propylethylmethylcyclohexyl, methylcycloheptyl, dimethylcycloheptyl, ethylcycloheptyl, propylcycloheptyl, ethylmethylcycloheptyl, trimethylcycloheptyl, diethylcycloheptyl, ethyldimethylcycloheptyl, propylmethylcycloheptyl, propylethylcycloheptyl, di-propylcycloheptyl and propylethylmethylcycloheptyl; aryl groups, such as phenyl and naphthyl; alkylaryl groups, such as tolyl, xylyl, ethylphenyl, propylphenyl, ethylmethylphenyl, trimethylphenyl, butylphenyl, propylmethylphenyl, diethylphenyl, ethyldimethylphenyl, tetramethylphenyl, pentylphenyl, hexylphenyl, heptylphenyl, octylphenyl, nonylphenyl, decylphenyl, undecylphenyl and dodecylphenyl; and arylalkyl groups, such as benzyl, methylbenzyl, dimethylbenzyl, phenethyl, methylphenethyl and dimethylphenethyl. The above hydrocarbon groups include all possible isomers. Among others, preferred are $C_1$-$C_{18}$ straight- or branched-chain alkyl group and $C_6$-$C_{18}$ aryl or straight- or branched-chain alkylaryl group.

The zinc dithiophosphate compounds are preferably exemplified by zinc diisopropyldithiophosphate, zinc diisobutyldithiophosphate, zinc di-sec-butyldithiophosphate, zinc di-sec-pentyldithiophosphate, zinc di-n-hexyldithiophosphate, zinc di-sec-hexyldithiophosphate, zinc di-octyldithiophosphate, zinc di-2-ethylhexyldithiophosphate, zinc di-n-decyldithiophosphate zinc di-n-dodecyldithiophosphate, and zinc diisotridecyldithiophosphate.

The amount of the zinc dithiophosphate contained in the lubricating oil is not particularly restricted. In order to obtain a larger friction reducing effect, the zinc dithiophosphate is preferably contained in an amount of 0.1% or less, more preferably in an amount of 0.06% or less, most preferably in a minimum effective amount, in terms of the phosphorus element based on the total mass of the lubricating oil. When the amount of the zinc dithiophosphate in the lubricating oil exceeds 0.1%, there is a possibility that the effect of the ashless fatty-ester friction modifier and/or the ashless aliphatic-amine friction modifier may become inhibited.

The production method of the zinc dithiophosphate is not particularly restricted, and the zinc dithiophosphate can be prepared by any known method. For example, the zinc dithiophosphate may be prepared by reacting alcohols or phenols having the above $R^4$, $R^5$, $R^6$ and $R^7$ hydrocarbon groups with phosphorous pentasulfide to form dithiophosphoric acid, and then, neutralizing the thus-formed dithiophosphoric acid with zinc oxide. It is noted that the molecular structure of zinc dithiophosphate differs according to the alcohols or phenols used as a raw material for the zinc dithiophosphate production.

The above zinc dithiophosphate compounds can be used alone or in the form of a mixture of two or more thereof. In the case of using two or more zinc dithiophosphate compounds in combination, there is no particular limitation to the mixing ratio of the zinc dithiophosphate compounds.

The above-specified lubricating oil provides a great friction reducing effect on the sliding friction between two opposed sliding surfaces especially when one of the sliding surfaces is of hard carbon material and the other of the sliding surfaces is of hard carbon material or metallic material.

In order to improve the properties of the lubricating oil especially for use in an internal combustion engine, the lubricating oil may further include any other additive or additives, such as a metallic detergent, an antioxidant, a viscosity index improver, a friction modifier other than the above-mentioned fatty-ester and aliphatic-amine friction modifiers, an ashless dispersant other than the above-mentioned polybutenyl succinimide and polybutenyl succinimide derivative, an anti-wear agent or extreme-pressure agent, a rust inhibitor, a nonionic surfactant, a demulsifier, a metal deactivator and/or an anti-foaming agent.

The metallic detergent can be selected from any metallic detergent compound commonly used for lubricants. Specific examples of the metallic detergent include sulfonates, phenates and salicylates of alkali metals, such as sodium (Na) and potassium (K), or of alkali-earth metals, such as calcium (Ca) and magnesium (Mg); and mixtures of two or more thereof. Among others, sodium and calcium sulfonates, sodium and calcium phenates, and sodium and calcium salicylates are suitably used. The total base number and amount of the metallic detergent can be selected in accordance with the properties desired of the lubricating oil. The total base number of the metallic detergent is usually 0 to 500 mgKOH/g, preferably 150 to 400 mgKOH/g, as measured by perchloric acid method according to ISO 3771. The amount of the metallic detergent is usually 0.1 to 10% based on the total mass of the lubricating oil.

The antioxidant can be selected from any antioxidant compounds commonly used for lubricants. Specific examples of the antioxidant include: phenolic antioxidants, such as 4,4'-methylenebis(2,6-di-tert-butylphenol) and octadecyl-3-(3,5-di-tert-butyl-4-hydroxyphenyl)propionate; amino antioxidants, such as phenyl-α-naphthylamine, alkylphenyl-α-naphthylamine and alkyldiphenylamine; and mixtures of two or more thereof. The amount of the antioxidant is usually 0.01 to 5% based on the total mass of the lubricating oil.

As the viscosity index improver, there may be used: non-dispersion type polymethacrylate viscosity index improvers, such as copolymers of one or more kinds of methacrylates and hydrogenated products thereof; dispersion type polymethacrylate viscosity index improvers, such as copolymers of methacrylates further including nitrogen compounds; and other viscosity index improvers, such as copolymers of ethylene and α-olefin (e.g. propylene, 1-butene and 1-pentene) and hydrogenated products thereof, polyisobutylenes and hydrogenated products thereof, styrene-diene hydrogenated copolymers, styrene-maleate anhydride copolymers and polyalkylstyrenes. The molecular weight of the viscosity index improver needs to be selected in view of the shear stability. For example, the number-average molecular weight of the viscosity index improver is desirably in a range of 5000 to 1000000, more desirably 100000 to 800000, for the dispersion or non-dispersion type polymethacrylates; in a range of 800 to 5000 for the polyisobutylene or hydrogenated product thereof; and in a range of 800 to 300000, more desirably 10000 to 200000 for the ethylene/α-olefin copolymer or hydrogenated product thereof. The above viscosity index improving compounds can be used alone or in the form of a mixture of two or more thereof. The amount of the viscosity index improver is preferably 0.1 to 40.0% based on the total mass of the lubricating oil.

The friction modifier other than the above-mentioned fatty-ester and aliphatic-amine friction modifiers can be any of ashless friction modifiers, such as boric acid esters, higher alcohols and aliphatic ethers, and metallic friction modifiers, such as molybdenum dithiophosphate, molybdenum dithiocarbamate and molybdenum disulfide.

The ashless dispersant other than the above-mentioned polybutenyl succinimide and polybutenyl succinimide derivative can be any of polybutenylbenzylamines and polybutenylamines each having polybutenyl groups of which the number-average molecular weight is 900 to 3500, polybutenyl succinimides having polybutenyl groups of which the number-average molecular weight is less than 900, and derivatives thereof.

As the anti-friction agent or extreme-pressure agent, there may be used: disulfides, sulfurized fats, olefin sulfides, phosphate esters having one to three $C_2$-$C_{20}$ hydrocarbon groups, thiophosphate esters, phosphite esters, thiophosphite esters and amine salts of these esters.

As the rust inhibitor, there may be used: alkylbenzene sulfonates, dinonylnaphthalene sulfonates, esters of alkenylsuccinic acids and esters of polyalcohols.

As the nonionic surfactant and demulsifier, there may be used: noionic polyalkylene glycol surfactants, such as polyoxyethylene alkylethers, polyoxyethylene alkylphenylethers and polyoxyethylene alkylnaphthylethers.

The metal deactivator can be exemplified by imidazolines, pyrimidine derivatives, thiazole and benzotriazole.

The anti-foaming agent can be exemplified by silicones, fluorosilicones and fluoroalkylethers.

Each of the friction modifier other than the fatty-ester and aliphatic-amine friction modifiers, the ashless dispersant other than the polybutenyl succinimide and polybutenyl succinimide derivative, the anti-wear agent or extreme-pressure agent, the rust inhibitor and the demulsifier is usually contained in an amount of 0.01 to 5% based on the total mass of the lubricating oil, the metal deactivator is usually contained in an amount of 0.005 to 1% based on the total mass of the lubricating oil, and the anti-foaming agent is usually contained in an amount of 0.0005 to 1% based on the total mass of the lubricating oil.

The present invention will be described in more detail by reference to the following examples. However, it should be noted that the following examples are only illustrative and not intended to limit the invention thereto.

PREPARATION OF TEST SAMPLES

EXAMPLE 1

A substantially-semicylindrical base block having a dimension of 8×12×40 mm (with a semicylindrical portion formed at a radius of 20 mm) was first cut from an aluminum alloy material AC8A according to JIS H5202. It should be noted that the aluminum alloy material AC8A is commonly used as a connecting rod material. A DLC coating film having a hydrogen content of 0.2 atomic %, a Knoop hardness Hk of 2170 kg/mm$^2$, a maximum height surface roughness Ry (=Rmax) of 0.03 μm and a thickness of 0.5 μm was formed on the semicylindrical portion of the base block by a PVD arc ion plating process, thereby giving a test piece. Herein, the surface roughness Ry is explained as Rz according to JIS B0601.

Next, a plate-shaped block having a dimension of 8×12× 40 mm was cut from iron casting FC250 (FCA) according to JIS G5501 and finished to give an opposite piece with a sliding surface controlled to a center line surface roughness Ra of 0.1 μm. The surface roughness Ra is herein explained as $Ra_{75}$ according to JIS B0601.

The test piece and the opposite piece were then subjected to the following friction/wear test using a lubricating oil H.

EXAMPLES 2-8

The same test pieces and the same opposite pieces as used in Example 1 were prepared. Then, the test pieces and the opposite pieces were subjected to the friction/wear test using lubricating oils A-G.

COMPARATIVE EXAMPLE 1

A substantially-semicylindrical block having a dimension of 8×12×40 mm (with a semicylindrical portion formed at a radius of 20 mm) was cut from FC250 iron casting according to JIS G5501 and used as a test piece without being given any coating.

A plate-shaped block having a dimension of 8×12×40 mm was cut from iron casting FC250 (FCA) according to JIS G5501 and finished to give an opposite piece with a sliding surface a center line surface roughness Ra of 0.1 μm. The surface roughness Ra is herein explained as $Ra_{75}$ according to JIS B0601.

The test piece and the opposite piece were subjected to the following friction/wear test using a lubricating oil H.

Preparation of Lubricating Oils

The lubricating oils A-H were each prepared by blending a base oil with a friction modifier(s), an ashless dispersant, zinc dialkyldithiophospate, a metallic detergent and other additives. The compositions and properties of the lubricating oils A-H are shown in TABLE 1. In TABLE 1, the amount of base oil compound is indicated with reference to the total mass of the base oil, and the amount of each additive is indicated with reference to the total mass of the lubricating oil.

Friction/Wear Test

The friction/wear test was conducted under the following conditions using a reciprocating friction/wear tester. In the friction/wear tester, the test piece was reciprocated while sliding the semicylindrical portion of the test piece on the opposite piece under a load. During the test, the coefficient of friction between the test piece and the opposite piece was measured at a turning end of the reciprocating motion. The test results are shown in TABLE 2.

| (Test conditions) | |
|---|---|
| Test piece: | A semicylindrical-shaped piece formed of aluminum alloy AC8A with or without a DLC coating and having a dimension of 8 × 12 × 40 mm |
| Opposite piece: | A plate-shaped member formed of iron casting FC250 and having a dimension of 40 × 60 × 7 mm |
| Test unit: | Reciprocating friction/wear tester |
| Reciprocating motion: | 600 cycles per minute |
| Test temperature: | 25° C. |
| Load (P) applied: | 10 kgf. |
| Test time: | 60 min. |

TABLE 1

| Lubricating oil | | A | B | C | D |
|---|---|---|---|---|---|
| Base oil | Mineral oil [1] | 100 | 100 | — | 100 |
| | Synthetic oil [2] | — | — | 100 | — |
| Additives | Ester friction modifier [3] | 1.0 | 1.0 | 1.0 | — |
| | Amine friction modifier [4] | — | — | — | 1.0 |
| | Ashless dispersant [5] | 5.0 | 5.0 | 5.0 | 5.0 |
| | ZDTP [6] (in terms of phosphorus element) | — | 0.047 | 0.047 | 0.047 |
| | Metallic detergent [7] (in terms of metal element) | 0.15 | 0.15 | 0.15 | 0.15 |
| | Metallic detergent [8] (in terms of metal element) | 0.50 | 0.50 | 0.50 | 0.50 |
| | Others [9] | 0.90 | 0.90 | 0.90 | 0.90 |
| Properties | Kinematic viscosity (mm$^2$/s) at 100° C. | 10.3 | 10.2 | 10.0 | 10.2 |
| | Total base number (mgKOH/g) according to perchloric acid method | 6.2 | 6.2 | 6.2 | 6.2 |
| | Total base number (mgKOH/g) according to hydrochloric method | 4.5 | 4.5 | 4.5 | 4.5 |

| Lubricating oil | | E | F | G | H |
|---|---|---|---|---|---|
| Base oil | Mineral oil [1] | 100 | 100 | 100 | 100 |
| | Synthetic oil [2] | — | — | — | — |
| Additives | Ester friction modifier [3] | 1.0 | 1.0 | 0.2 | — |
| | Amine friction modifier [4] | — | 0.5 | — | — |
| | Ashless dispersant [5] | 5.0 | 5.0 | 5.0 | 5.0 |
| | ZDTP [6] (in terms of phosphorus element) | 0.094 | 0.094 | 0.047 | 0.094 |
| | Metallic detergent [7] (in terms of metal element) | 0.15 | 0.15 | 0.15 | 0.15 |
| | Metallic detergent [8] (in terms of metal element) | 0.50 | 0.50 | 0.50 | 0.50 |
| | Others [9] | 0.90 | 0.90 | 0.90 | 0.90 |

TABLE 1-continued

| Properties | | | | | |
|---|---|---|---|---|---|
| Kinematic viscosity (mm²/s) at 100° C. | 10.3 | 10.3 | 10.3 | 10.3 |
| Total base number (mgKOH/g) according to perchloric acid method | 6.5 | 6.5 | 6.5 | 6.5 |
| Total base number (mgKOH/g) according to hydrochloric method | 5.2 | 5.2 | 5.2 | 5.2 |

[References]
[1] Hydrocracked mineral oil (kinematic viscosity at 100° C.: 5.0 mm²/s, viscosity index: 120, aromatic content: 5.5%)
[2] 1-Decene oligomer hydride (kinematic viscosity at 100° C.: 3.9 mm²/s, viscosity index: 124, aromatic content: 0.0%)
[3] Glycerol monooleate
[4] N,N-dipolyoxyethylene-N-oleylamine
[5] Polybutenyl succinimide (nitrogen content: 1.2%)
[6] Zinc dialkyldithiophosphate (zinc content: 9.3%, phosphorus content: 8.5%, alkyl group: secondary butyl or hexyl group)
[7] Calcium sulfonate (total base number: 300 mgKOH/g, calcium content: 12.0%)
[8] Calcium phenate (total base number: 255 mgKOH/g, calcium content: 9.2%)
[9] Viscosity index improver, antioxidant, rust inhibitor, demulsifier, nonionic surfactant, metal deactivator and anti-foaming agent etc.

TABLE 2

| | Test Piece | | | | |
|---|---|---|---|---|---|
| | Coating film material | Base material | Opposite piece Material | Lubricating oil | Friction coefficient |
| Example 1 | DLC | AC8A | FC250 | H | 0.08 |
| Example 2 | DLC | AC8A | FC250 | A | 0.05 |
| Example 3 | DLC | AC8A | FC250 | B | 0.08 |
| Example 4 | DLC | AC8A | FC250 | C | 0.09 |
| Example 5 | DLC | AC8A | FC250 | D | 0.11 |
| Example 6 | DLC | AC8A | FC250 | E | 0.11 |
| Example 7 | DLC | AC8A | FC250 | F | 0.11 |
| Example 8 | DLC | AC8A | FC250 | G | 0.08 |
| Comparative Example 1 | No coating | AC8A | FC250 | H | 0.13 |

It is apparent from TABLE 2 that the test pieces of Examples 1-8 (having their respective sliding portions covered with DLC coatings according to the present invention) showed much lower friction coefficients than that of Comparative Example 1 (having its sliding portion covered with no DLC coating). Among others, the test pieces of Examples 2-4, lubricated with the lubricating oil A-C containing therein an ashless fatty-ester friction modifier, obtained substantial reductions in friction coefficients. This raises expectations for improvement in scuff/wear resistance.

As described above, it is possible in the present embodiment to reduce the sliding friction between connecting rod 1 and crankpin 2 and between connecting rod 1 and piston pin 3a in the presence of the above-specified lubricating oil, protect connecting rod 1, crankpin 2 and piston pin 3a from wear and, when used in an internal combustion engine, produce great improvements in engine performance, fuel efficiency and reliability/durability.

The entire contents of Japanese Patent Application No. 2003-208286 (filed on Aug. 21, 2003) and No. 2003-207494 (filed on Aug. 13, 2003) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. A structure for connecting a piston to a crankshaft in an internal combustion engine, comprising:
   a piston pin fitted into the piston;
   a crankpin integral with the crankshaft; and
   a connecting rod having a piston pin bearing portion slidably engaged with an outer cylindrical portion of the piston pin and a crankpin bearing portion slidably engaged with an outer cylindrical portion of the crankpin,
   wherein at least one of the piston pin bearing portion of the connecting rod and the outer cylindrical portion of the piston pin and at least one of the crankpin bearing portion of the connecting rod and the outer cylindrical portion of the crankpin have hard carbon coatings formed thereon by physical vapor deposition with a hydrogen content of 1 atomic % or less.

2. A structure according to claim 1, wherein the connecting rod is made of an aluminum alloy material.

3. A structure for connecting a piston to a crankshaft in an internal combustion engine, comprising:
   a piston pin fitted into the piston;
   a crankpin integral with the crankshaft;
   a connecting rod having a piston pin bearing portion slidably engaged with an outer cylindrical portion of the piston pin and a crankpin bearing portion slidably engaged with an outer cylindrical portion of the crankpin; and
   a lubricating oil supplied to a sliding interface between the piston pin and the connecting rod and a sliding interface between the crankpin and the connecting rod;
   wherein at least one of the piston pin bearing portion of the connecting rod and the outer cylindrical portion of the piston pin and at least one of the crankpin bearing portion of the connecting rod and the outer cylindrical portion of the crankpin have hard carbon coatings formed thereon by physical vapor deposition with a hydrogen content of 20 atomic % or less, and
   wherein the lubricating oil contains therein at least one friction modifier selected from the group consisting of an ashless fatty-ester friction modifier and an ashless aliphatic-amine friction modifier.

4. A structure according to claim 3, wherein at least one friction modifier has a C6-C30 hydrocarbon group, and is contained in an amount of 0.05 to 3.0% by mass based on a total mass of the lubricating oil.

5. A structure according to claim 3, wherein the lubricating oil contains polybutenyl succinimide and/or a derivative thereof.

6. A structure according to claim 5, wherein the polybutenyl succinimide and/or derivative thereof is contained in an amount of 0.1 to 15% by mass based on a total mass of the lubricating oil.

7. A structure according to claim 3, wherein the lubricating oil contains zinc dithiophosphate in an amount of 0.1% or less by mass in terms of phosphorus element based on a total mass of the lubricating oil.

8. A structure according to claim 1, wherein the hard carbon coatings are formed by arc ion plating.

9. A structure for connecting a piston to a crankshaft in an internal combustion engine, comprising:
   a piston pin fitted into the piston;
   a crankpin integral with the crankshaft;
   a connecting rod having a piston pin bearing portion slidably engaged with an outer cylindrical portion of the piston pin and a crankpin bearing portion slidably engaged with an outer cylindrical portion of the crankpin; and
   a lubricating oil supplied to a sliding interface between the piston pin and the connecting rod and a sliding interface between the crankpin and the connecting rod,
   wherein at least one of the piston pin bearing portion of the connecting rod and the outer cylindrical portion of the piston pin and at least one of the crankpin bearing portion of the connecting rod and the outer cylindrical portion of the crankpin have hard carbon coatings formed thereon by physical vapor deposition with a hydrogen content of 1 atomic % or less; and
   wherein the lubricating oil contains therein at least one friction modifier selected from the group consisting of an ashless fatty-ester friction modifier and an ashless aliphatic-amine friction modifier.

10. A structure for connecting a piston to a crankshaft in an internal combustion engine, comprising:
    a piston pin fitted into the piston;
    a crankpin integral with the crankshaft; and
    a connecting rod having a piston pin bearing portion slidably engaged with an outer cylindrical portion of the piston pin and a crankpin bearing portion slidably engaged with an outer cylindrical portion of the crankpin,
    wherein at least one of the piston pin bearing portion of the connecting rod and the outer cylindrical portion of the piston pin and at least one of the crankpin bearing portion of the connecting rod and the outer cylindrical portion of the crankpin have hard carbon coatings formed thereon with a hydrogen content of 1 atomic % or less.

* * * * *